Patented July 7, 1942

2,288,810

UNITED STATES PATENT OFFICE 2,288,810

MILDEWPROOFING AND MOTHPROOFING TREATMENT

Martin Leatherman, Hyattsville, Md.

No Drawing. Application March 22, 1941,
Serial No. 384,699

15 Claims. (Cl. 8—136.5)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This is a continuation in part of my co-pending application for patent, Serial No. 242,124, filed November 23, 1938, which issued April 15, 1941, as Patent No. 2,238,850.

This invention relates to mildewproofing of fabrics which are used in contiguity with rubber, such as cotton hose lined with rubber, beltings, raincoats, rubberized shower curtains, rubber elasticized fabrics, and so forth. This invention also relates to a combination of mildewproofing and mothproofing for plant and animal fibre fabrics subject to the destructive action of fungi or insect larvae, such as wool, cotton, silk, mohair, and so forth.

One of the objects of this invention is to provide mildewproofing means which are colorless and which will not be readily removed by the ordinary so-called dry cleaning solvents or by water.

Another object of my invention is to provide substances which possess high mildewinhibiting power and which may be used in close association with rubber without any deleterious effect upon the rubber.

Heretofore copper has been the most common mildewproofing metal, but it is unsatisfactory when used in rubberized fabrics because it induces changes in the rubber component and also the copper is absorbed by the rubber with resulting destruction of its mildewproofing action. I have discovered that cadmium has no injurious effect whatever upon rubber, and that it is approximately twice as effective as copper in inhibiting growth activity of organisms in cellulose. The action of the cadmium is inherent and is exerted regardless of the type of compound in which the cadmium is bound, and without regard to the solubility of the compound. Since the very soluble compounds will be more readily removed by exposure to water action, I prefer to use relatively water-insoluble compounds of cadmium in practicing my invention, but I may also use soluble compounds such as cadmium chloride, cadmium sulfate and the like. Among the relatively insoluble compounds I may use cadmium pentachlorophenate, cadmium naphthenate, cadmium ortho-phenylphenate, cadmium carbonate, cadmium hydroxide, cadmium oxide, cadmium orthophosphate, cadmium silicate, cadmium chloro-ortho-phenylphenate, cadmium 2,4,dichloro-ortho-phenylphenate, and cadmium 2,4,dibromo-ortho-phenylphenate. In general, the types of cadmium compounds which can be used, both organic and inorganic, are those which, under the moist conditions associated with fungus growth, yield a sufficient amount of cadmium ions to exert their inhibiting effect upon fungus growth.

The method of treating the material is by the usual metathetical reactions employed to deposit precipitates on fibrous materials which comprises either (1) first wetting out the materials with a water-soluble salt of cadmium of the desired concentration, drying, and then wetting with a solution of the precipitant or (2) first wetting out the materials with a solution of the precipitant, drying, and then wetting with a solution of the cadmium salt, respectively. For example, if it is desired to introduce cadmium carbonate, the fabric is first wetted with a solution of, for example, cadmium chloride, dried and then immersed in a solution of sodium carbonate. This order of procedure will ordinarily be preferred to the reverse order when inorganic compounds are being deposited on cellulosic materials.

The common fatty acid soaps of cadmium such as the oleate, palmitate, and stearate may also be used. These soaps are practically insoluble in such solvents as carbon tetrachloride, gasoline, Stoddard's solvent, and solvent naphtha. This is not true with respect to the non-fatty acid soaps, such as the resinate, which are very soluble in these solvents. For this reason, fabrics treated with the fatty acid soaps of cadmium may be dry cleaned, whereas the non-fatty acid soaps of cadmium would be removed from fabrics by dry cleaning, although mildewproofing action is obtained in both cases.

I have found that five-hundredths of one percent of cadmium by weight is sufficient, even in the case of the most insoluble compounds, such as the fatty acid soaps, to prevent mildewing of cellulose fabrics. An illustrative method of treating the fabric with an insoluble soap in accordance with my invention comprises saturating the fabric with a solution of ordinary alkali soap of sufficient concentration to fix approximately five-hundredths of one percent of cadmium by weight, thence drying the fabric, and then immersing it in a solution of a cadmium salt as a precipitant, such as the chloride, which solution preferably contains a wetting agent, such as sodium lauryl sulphate, for example. The fabric is then washed. If desired, it may also be treated with a solution to precipitate the wetting agent. When using sodium lauryl sulphate as the wetting agent, a solution of a potassium salt may be used for this purpose. The fabric is then dried. By treating the fabric, before the first drying step in the method described above is quite completed, with a solution of silicofluoride both mildewproofing and mothproofing is effected and the remaining steps in the process may be omitted, since this solution precipitates the cadmium soap in the fabric. The fabric being somewhat damp, it absorbs sufficient cadmium fluorsilicate solution to precipitate the soap compound, leaving a residue of cadmium soap and alkali fluosilicate in the fabric. Fluosilicates are of value for mothproofing, and the waterproofing effect of the cadmium soap prevents easy removal of the residual water-soluble cadmium and alkali fluosilicate except by prolonged exposure to water. Fluosilicate would not be employed except in the case of cellulosic materials which are mixed with animal fibers such as wool.

The cadmium soap may also be introduced into the fibrous material by making use of certain mixed solvents to dissolve the soap and carry it into and through the fibrous material. For example, the cadmium soap can be dissolved in a hot solution of a solvent consisting of two parts benzene, one part acetone, and one part methanol by volume. Mixed solvents, such as this one, especially when warm, retain enough cadmium soap in solution to permit the introduction of the soap into the material to be treated by wetting it with the solution and then drying the fabric.

Cadmium fluosilicate may also be used by itself to effect a combination of mildewproofing and mothproofing. Being soluble in water, but not in organic solvents, it may be employed in the home to temporarily protect washable garments prior to storing. Such garments can be treated by simply immersing them in the cadmium fluosilicate solution and then permitting the solvent to evaporate. So-called dry cleaning would not affect the fabric treated in this manner. A one-tenth of one percent solution of cadmium fluosilicate will normally introduce a sufficient protective quantity in the fabric after the fabric is wetted with it and squeezed, wrung, or centrifuged. Ordinarily, five-hundredths of one percent by weight of elemental cadmium and an equal amount of the fluosilicate ($SiF_6$) radical will give satisfactory protection.

Having thus described my invention, I claim:

1. An article of manufacture comprising a rubberized fabric impregnated with a mildewproofing agent compatible with rubber, said agent having as its essential active ingredient a cadmium containing compound.

2. An article of manufacture comprising a rubberized fabric impregnated with a mildewproofing agent compatible with rubber, said agent having as its essential active ingredient a cadmium salt.

3. An article of manufacture comprising a rubberized fabric impregnated with a mildewproofing agent compatible with rubber, said agent having as its essential active ingredient cadmium chloride.

4. An article of manufacture comprising a rubberized fabric impregnated with a mildewproofing agent compatible with rubber, said agent having as its essential active ingredient cadmium sulphate.

5. An article of manufacture comprising a rubberized fabric impregnated with a mildewproofing agent compatible with rubber, said agent having as its essential active ingredient cadmium carbonate.

6. An article of manufacture comprising a rubberized fabric impregnated with a mildewproofing agent compatible with rubber, said agent having as its essential active ingredient cadmium hydroxide.

7. An article of manufacture comprising a rubberized fabric impregnated with a mildewproofing agent compatible with rubber, said agent having as its essential active ingredient cadmium oxide.

8. An article of manufacture comprising a rubberized fabric impregnated with a mildewproofing agent compatible with rubber, said agent having as its essential active ingredient cadmium orthophosphate.

9. An article of manufacture comprising a rubberized fabric impregnated with a mildewproofing agent compatible with rubber, said agent having as its essential active ingredient cadmium silicate.

10. An article of manufacture comprising a rubberized fabric impregnated with a mildewproofing agent compatible with rubber, said agent having as its essential active ingredient cadmium pentachlorophenate.

11. An article of manufacture comprising a rubberized fabric impregnated with a mildewproofing agent compatible with rubber, said agent having as its essential active ingredient cadmium naphthenate.

12. An article of manufacture comprising a rubberized fabric impregnated with a mildewproofing agent compatible with rubber, said agent having as its essential active ingredient cadmium ortho-phenylphenate.

13. An article of manufacture comprising a rubberized fabric impregnated with a mildewproofing agent compatible with rubber, said agent having as its essential active ingredient cadmium chloro-ortho-phenylphenate.

14. An article of manufacture comprising a rubberized fabric impregnated with a mildewproofing agent compatible with rubber, said agent having as its essential active ingredient cadmium 2,4,dichloro-ortho-phenylphenate.

15. An article of manufacture comprising a rubberized fabric impregnated with a mildewproofing agent compatible with rubber, said agent having as its essential active ingredient cadmium 2,4,dibromo-ortho-phenylphenate.

MARTIN LEATHERMAN.